United States Patent
Vestesen et al.

(10) Patent No.: US 12,255,465 B2
(45) Date of Patent: Mar. 18, 2025

(54) METHOD AND SYSTEM FOR OPERATING AN ELECTRICAL GRID

(71) Applicant: Vestesen Hybrid Energy ApS, Hellerup (DK)

(72) Inventors: Søren Qvist Vestesen, Hellerup (DK); Thomas Qvist Vestesen, Copenhagen K (DK)

(73) Assignee: Vestesen Hybrid Energy ApS, Hellerup (DK)

(*) Notice: Subject to any disclaimer, the term of this patent is extended or adjusted under 35 U.S.C. 154(b) by 0 days.

(21) Appl. No.: 18/564,089

(22) PCT Filed: May 25, 2022

(86) PCT No.: PCT/EP2022/064173
§ 371 (c)(1),
(2) Date: Nov. 26, 2023

(87) PCT Pub. No.: WO2022/248539
PCT Pub. Date: Dec. 1, 2022

(65) Prior Publication Data
US 2024/0250536 A1    Jul. 25, 2024

(30) Foreign Application Priority Data

May 28, 2021  (DK) ............................ PA2021 70277

(51) Int. Cl.
*H02J 3/46*  (2006.01)
*F02B 67/04*  (2006.01)
(Continued)

(52) U.S. Cl.
CPC ............. *H02J 3/46* (2013.01); *H01M 10/44* (2013.01); *H02J 3/32* (2013.01); *H02J 7/04* (2013.01);
(Continued)

(58) Field of Classification Search
CPC .. H02J 3/46; H02J 7/04; H02J 2300/28; H02J 2300/24; H01M 10/44; F02B 67/04
See application file for complete search history.

(56) References Cited

U.S. PATENT DOCUMENTS

2003/0227276 A1\* 12/2003 Agbossou ......... H01M 8/04992
320/112
2005/0200133 A1     9/2005 Wobben
(Continued)

FOREIGN PATENT DOCUMENTS

WO      WO-2018033432 A1 \*  2/2018  ............... G05F 1/66
WO         2019180096 A1     9/2019

OTHER PUBLICATIONS

Danish Patent and Trademark Office, Grant, Reply to letter of Jun. 9, 2022, 5th technical examination of your patent application, Danish Patent Application PA 2021 70277, dated Jul. 21, 2022, 2 pages.

(Continued)

*Primary Examiner* — Jared Fureman
*Assistant Examiner* — Duc M Pham
(74) *Attorney, Agent, or Firm* — Nordic Patent Service

(57) ABSTRACT

A method and system for operating an isolated AC grid with a fluctuating source of electric power (FSEP) generated from renewable energy, and with a fluctuating AC power demand (FACPD). A selectively driven alternator is couplable to an IC engine fueled from a hydrogen tank. A hydrogen generator is powered by the FSEP. The method includes powering the hydrogen generator from the FESP when actual electric power generated by the FSEP exceeds FACPD and simultaneously the tank has storage capacity, storing the generated hydrogen in the tank and generating AC power with the SDA by combusting hydrogen from the tank in the IC engine when actual electric power generated by the FSEP (Continued)

is less than the FACPD, and the amount of hydrogen in the tank is above a hydrogen amount threshold.

19 Claims, 5 Drawing Sheets

(51) Int. Cl.
    *H01M 10/44*      (2006.01)
    *H02J 3/32*      (2006.01)
    *H02J 7/04*      (2006.01)

(52) U.S. Cl.
    CPC ........... *F02B 67/04* (2013.01); *H02J 2300/24* (2020.01); *H02J 2300/28* (2020.01); *H02J 2300/30* (2020.01)

(56) References Cited

U.S. PATENT DOCUMENTS

| | | | |
|---|---|---|---|
| 2009/0048716 A1 | 2/2009 | Marhoefer | |
| 2018/0287387 A1* | 10/2018 | Lansing, Jr. | ............. F03D 9/11 |
| 2022/0065162 A1* | 3/2022 | Hunt | ................... H02J 15/008 |

OTHER PUBLICATIONS

Danish Patent and Trademark Office, Intention to Grant, Danish Patent Application PA 2021 70277, dated Apr. 13, 2022, 3 pages.
European Patent Office, International Search Report, PCT/EP2022/064173, dated Sep. 27, 2022, 2 pages.
European Patent Office, Notification of Transmittal of the International Preliminary Report on Patentability, PCT/EP2022/064173, dated Sep. 27, 2023, 16 pages.
Nordic Patent Service, Reply to second Written Opinion issued on Mar. 9, 2023, International Application No. PCT/EP2022/064173, Dated Apr. 24, 2023, 15 pages.
Danish Patent and Trademark Office, 3rd Technical Examination, Application No. PA 2021 70277, dated Feb. 21, 2022, 3 pages.
Danish Patent and Trademark Office, Reply to your letter of Apr. 4, 2022, 4th technical examination of your patent application, Intention to Grant, PA 2021 70277, dated Apr. 12, 2022, 3 pages.
Nordic Patent Service, Response to Third Technical Examination issued Feb. 21, 2023 for application PA 2021 70277, Dated Apr. 4, 2022, 128 Pages.

* cited by examiner

METHOD AND SYSTEM FOR OPERATING AN ELECTRICAL GRID

TECHNICAL FIELD

The disclosure relates to, a method and system for operating an electrical grid, in particular a method and system for operating an isolated electrical grid in which most or all of the energy is generated by fluctuating renewable energy sources, for example, wind energy, solar energy, hydro energy and/or wave energy.

BACKGROUND

Isolated grids must be able to provide a stable AC power supply and cannot rely on drawing AC power supply from a connected grid. An isolated grid, that is operated with the aim of maximizing the exploration of renewable energy sources will typically have one or more sources of AC power coupled thereto that rely on a fluctuating source of renewable energy, e.g. wind power and/or solar power. Consumer demand also fluctuates, and hence it is unavoidable that they are periods where consumer demand exceeds AC power supply by the renewable energy sources.

A conventional way to bridge a longer time span with insufficient power from the renewable energy sources is to use internal combustion driven alternator. However, conventionally, such internal combustion engines operated on fossil fuels, which is detrimental to the environmental impact of the operation of the grid, e.g. the $CO_2$ emission aspect. Hence, there is a need for a way to bridge such time spent that is environmentally friendly and low on $CO_2$ emissions.

Isolated grids require a grid forming component that ensures stable voltage and frequency under all foreseeable operating scenarios. Conventionally, this function has largely been the responsibility of alternators driven by a prime mover such as an internal combustion engine, the internal combustion engine being powered by a carbon-based fuel. Due to the desire to phase out non-renewable energy sources, there is a desire for grids to be operated at least for a substantial amount of the operating time without a combustion engine driven alternator.

Thus, there is a need for a method and system for operating a grid that does not rely for a substantial part on grid forming by combustion engine driven alternators.

WO2019180096 discloses a method and plant of operating a grid forming power supply plant based on both a renewable energy, and a carbon based energy, such as carbon based fuel, the grid forming power supply system comprising: a power input connection from an renewable power supply system, a power input connection from an carbon fuel engine based generator set, the generator set comprising:—the engine for converting the carbon-based energy into motion energy, preferably equipped for low loading and fast response as disclosed in EP0745186, a generator, such as an alternator, for converting the motion energy into electrical energy, and a clutch for coupling and uncoupling of the engine with the generator, a power buffer, such as comprising a battery, subsystem for providing short term grid forming capacity, a plant grid forming controller for controlling grid parameters by means of controlling steps of a method according to one or more of the preceding claims, the plant grid forming controller comprising: interaction means for interacting with a control unit of the renewable power supply system, interaction means for interacting with a power buffer control unit, interaction means for interaction with a control unit of the generator set. However, this system still relies largely on the carbon fuel powered combustion engine that drives an alternator as a major component for ensuring stable voltage and frequency.

US2003227276A1 discloses a renewable energy (RE) system is disclosed which comprises an energy source providing unit, a DC bus, a buck converter, a hydrogen generator, an hydrogen storage, an energy conversion device, a boost converter, a DC to AC converter, and a monitoring system. This is a renewable uses renewable energy to generate hydrogen and uses the generated hydrogen to generate DC electric power when there is a shortage of renewable energy. This energy system is not a grid and operates with a DC bus.

US2005200133A1 discloses an isolated network with at least one power generator, which uses renewable energy sources, wherein the power generator is preferably a wind-power station with a first synchronous generator, with a dc voltage intermediate circuit with at least a first rectifier and an inverter, with a second synchronous generator and an internal combustion engine that can be coupled to the second synchronous generator. To realize an isolated network, for which the internal combustion engine can be deactivated completely, as long as the wind-power station generates sufficient power for all connected loads at the highest possible efficiency, a completely controllable wind-power station and an electromagnetic coupling between the second synchronous generator and the internal combustion engine are provided.

SUMMARY

It is an object to provide a method and system for forming a grid and ensuring stable voltage and frequency of an isolated grid, i.e. operating an electrical grid, which allows maximum penetration of renewable energy sources.

The foregoing and other objects are achieved by the features of the independent claims. Further implementation forms are apparent from the dependent claims, the description, and the figures.

According to a first aspect, there is provided a method for operating an isolated AC electrical grid, the grid having coupled thereto:
- at least one fluctuating source of AC electric power generated from renewable energy for supplying AC electric power to the AC electrical grid,
- consumers creating a fluctuating consumer AC power demand on the AC electrical grid,
- at least one selectively driven alternator the selectively driven alternator being selectively operably couplable to an internal combustion engine operated on hydrogen or a mixture of hydrogen and another fuel, the internal combustion engine being coupled to a hydrogen supply system, the hydrogen supply system comprising a hydrogen storage unit,
- at least one hydrogen generating unit coupled to the AC electrical grid and/or to the at least one fluctuating source of AC electric power, the method comprising:
- keeping the selectively driven alternator coupled to the AC electrical grid and online regardless of the alternator being coupled to the internal combustion engine,
- powering the at least one hydrogen generating unit with power from the at least one fluctuating source of AC electric power when actual AC electric power generated by the at least one fluctuating source of AC electric power exceeds actual consumer AC power demand and simultaneously hydrogen storage capacity is available in the hydrogen storage unit, for 10 generating hydrogen with the at least one hydrogen generating unit, storing hydrogen generated by the at least one hydrogen generating unit in the hydrogen storage unit, generating AC electric power with the at least one selectively driven alternator by combusting hydrogen from the hydrogen storage unit or a mixture of hydrogen from the hydrogen storage unit and another fuel in the internal combustion engine by operably coupling the internal combustion engine to the alternator and driving the alternator with the internal combustion engine, when actual AC electric power generated by the at least one fluctuating source of electric power is less than the actual consumer AC electric power demand and simultaneously the amount of hydrogen in the hydrogen storage unit is above a hydrogen amount threshold.

The combination of the distinguishing features allow for an isolated grid that uses a hydrogen generation unit that is powered exclusively by renewable energy, that has fluctuating AC power demand from multiple consumers, and that uses the stored hydrogen for AC power generation only when there is a deficit of renewable energy, and at the same time provides for a stable AC grid, despite the fluctuating supply of AC power from renewable energy, fluctuating demand of AC power from the consumers and a switching operation mode between using AC power for hydrogen generation to generate AC power by combusting hydrogen. The always online selectively driven alternators provide e for frequency stability both when hydrogen is generated using AC power and when hydrogen is combusted to generate AC power". The synchronized alternators will support the grid with inertia from the rotating mass, reactive power, and fault current if needed.

By providing a hydrogen generation system that is powered by renewable energy sources connected to the grid, and by storing the hydrogen generated with the hydrogen generation system and they generating AC power using an internal combustion driven alternator by combusting the stored hydrogen, when, the sources of renewable energy are not sufficient to meet the consumer demand on the grid, and isolated grid is provided that is capable of bridging periods where insufficient direct AC power from renewable energy sources is available, without needing to turn to none renewable energy sources.

In a possible implementation form of the first aspect, internal combustion engine operates on a mixture hydrogen and a liquid fuel, such as fuel oil (pilot oil). The fuel can be supplied to the internal combustion engine separately from the hydrogen. The fuel oil can be supplied as a pilot oil, i.e. as an oil that ensures or assists ignition. Preferably, the fuel is injected at high pressure from fuel valves and the injection of the fuel oil can be used timed for timed ignition.

In a possible implementation form of the first aspect, the internal combustion engine is a compression ignited engine, i.e. an engine operating to the Diesel principle, and fuel is injected when the piston(s) is(are) at or near top dead center.

In a possible interpretation of the first aspect, the internal combustion engine operates according to the Otto principle, and a mixture of fuel and charging air is compressed during the stroke of the piston from bottom dead center to top dead center.

In a possible implementation of the first aspect, the mixture of hydrogen from the hydrogen storage unit and another fuel comprises a mixture of hydrogen from the hydrogen storage unit and one or more of petroleum gas, natural gas, syngas, biogas, ammonia. Biogas is a mixture of gases, primarily consisting of methane, carbon dioxide and hydrogen sulphide, produced from raw materials such as agricultural waste, manure, municipal waste, plant material, sewage, green waste and food waste.

In a possible implementation form of the first aspect, an electric battery is connected to the grid by an inverter, comprising generating AC power with the at least one selectively driven alternator by combusting hydrogen from the hydrogen storage unit or a mixture of hydrogen from the hydrogen storage unit and another fuel in the internal combustion engine, when the charge level of the electric battery is below a first battery charge level threshold, preferably comprising delaying powering the at least one hydrogen generation unit, until said electrically battery has reached the first battery charge level threshold.

In a possible implementation form of the first aspect, the controller is configured to ramp up and down hydrogen production with the generation unit as a function, preferably a proportional correlation, of the availability of actual surplus electric power generated by the at least one fluctuating source of electric power wherein actual surplus electric power is defined as the amount to which the actual power generated by the at least one fluctuating source of electric power exceeds the actual consumer AC power demand.

In a possible implementation form of the first aspect, exclusively hydrogen from the hydrogen storage unit is combusted in the internal combustion engine, though covering the possibility to use e.g. fuel oil as ignition liquid (pilot oil).

In a possible implementation form of the first aspect, hydrogen from the hydrogen storage unit is combusted in the internal combustion engine, as a mixture of hydrogen from the hydrogen storage unit and other fuels such as fuel oil, or fuel gas or hydrogen from another source.

In a possible implementation form of the first aspect, the controller is configured to ramp up and down hydrogen production with the hydrogen generation unit as a function, preferably a proportional correlation, of the frequency of the grid.

In a possible implementation form of the first aspect, the method comprises pressuring hydrogen generated by the hydrogen generating unit using a high-pressure pump driven by an electric drive motor and comprising powering the electric drive motor with electric power generated by the at least one fluctuating source of electric power.

In a possible implementation form of the first aspect, the method comprises determining the actual consumer AC power demand, determining the actual electric power generated by at least one fluctuating source of electric power, and preferably comparing the actual consumer AC power demand with the actual electric power generated by the at least one fluctuating source of electric power.

In a possible implementation form of the first aspect, the at least one fluctuating source of electric power comprises a photovoltaic unit coupled to an inverter for inverting DC power generated by the photovoltaic unit to AC power, the inverter preferably being coupled to a busbar.

In a possible implementation form of the first aspect, the at least one fluctuating source of electric power comprises at least one wind turbine, the wind turbine preferably being directly driving a wind turbine driven alternator coupled to a busbar.

In a possible implementation form of the first aspect, the hydrogen generating unit comprises an electrolysis unit, the electrolysis unit being supplied with electric power to one or more of: the photovoltaic unit, the inverter, the wind turbine, the busbar.

In a possible implementation form of the first aspect, the fluctuating source of electric power the hydrogen generating unit and the selectively driven alternator, the selectively driven alternator and/or the inverter are connected to a busbar.

In a possible implementation form of the first aspect, a clutch system between the internal combustion engine and the selectively driven alternator, the clutch system preferably being controlled by the controller.

In a possible implementation form of the first aspect, the selectively driven alternator is coupled to the grid and kept online regardless of the alternator being coupled to the internal combustion engine or not.

In a possible implementation form of the first aspect, the controller is configured to clutch-in the internal combustion engine when the internal combustion engine is at synchronous rpm with the selectively driven alternator.

In a possible implementation form of the first aspect, the method comprises generating AC power with the at least one selectively driven alternator by combusting fuel other than hydrogen from storage unit in the internal combustion engine, when actual electric power generated by the at least one fluctuating source of electric power is less than the consumer AC power demand and simultaneously the amount of hydrogen in the hydrogen storage unit is below a hydrogen amount threshold.

In a possible implementation form of the first aspect, least a selectively driven alternator being selectively operably couplable to an internal combustion engine operated on a fuel other than hydrogen from storage unit, the method comprising generating AC power with the at least one selectively driven alternator by combusting fuel other than hydrogen from storage unit in the internal combustion engine, when actual electric power generated by the at least one fluctuating source of electric power is less than the consumer AC power demand and simultaneously the amount of hydrogen in the hydrogen storage unit is below a hydrogen amount threshold.

In a possible implementation form of the first aspect the internal combustion engine is configured to be pre-pressuring and heated for optimal operation in lower loads and for having fast response and start-up.

In a possible implementation form of the first aspect the alternator is equipped with an air duct system for ventilation air connecting an internal combustion engine filter housing.

In a possible implementation form of the first aspect the internal combustion engine is equipped with a separate pre-pressuring system for pressurizing an internal combustion engine filter housing.

In a possible implementation form of the first aspect for control of heating of the internal combustion engine the air cooler system is separated from the engine and controlled by temperature.

In a possible implementation form of the first aspect for control of heating of the internal combustion engine the internal combustion engine is equipped with a pre-heating system.

In a possible implementation form of the first aspect, a fuel cell is coupled to the grid via an inverter, the fuel cell being coupled to the hydrogen storage unit, comprising generating AC power with the fuel cell by converting hydrogen from the hydrogen storage unit into DC power and converting the DC power into AC power with the inverter when the actual electric power generated by the at least one fluctuating source of electric power is less than the consumer AC power demand and simultaneously the amount of hydrogen in the hydrogen storage unit is above a hydrogen amount threshold, the hydrogen amount threshold being greater than or equal to 0.

In a possible implementation form of the first aspect, the method comprises:
  operating the at least one fluctuating source of AC power as a slave to the grid,
  measuring grid frequency, controlling grid frequency with a controllable inverter as master controller to obtain a desired grid frequency,
  supplying power from an electric battery through the controllable inverter to the grid when the measured grid frequency is below the desired grid frequency by more than a first lower margin, and
  withdrawing power through the controllable inverter from the grid to the electric battery when the measured grid frequency is above the desired grid frequency by more than a second first upper margin.

In a possible implementation form of the first aspect, the method comprises increasing AC power production with the fuel cell and the inverter according to a defined slope when the measured grid frequency is below the desired grid frequency by more than a fourth lower margin, decreasing AC power production with the fuel cell and the inverter according to a defined slope when the measured grid frequency exceeds the desired grid frequency by more than a fourth upper margin.

In a possible implementation form of the first aspect, the system comprises an electric battery coupled to the grid by an inverter, and the method comprises powering the at least one hydrogen generating unit with power from the at least one fluctuating source of electric power when, and preferably only when, actual electric power generated by the at least one fluctuating source of electric power exceeds actual consumer AC power demand and battery charge level is above an upper charge level set point and simultaneously hydrogen storage capacity is available in the hydrogen storage unit and battery charge level of the electric battery is above a battery charge threshold.

According to a second aspect, there is provided an energy supply system for operating an isolated AC electrical grid, the grid having coupled thereto:
  at least one fluctuating source of AC electric power generated from renewable energy for supplying AC electric power to the AC electrical grid,
  consumers creating a fluctuating consumer AC electric power demand on the AC electrical grid, at least one selectively driven alternator, the selectively driven alternator being selectively operably couplable to an internal combustion engine operated on hydrogen or a mixture of hydrogen and another fuel, the internal combustion engine being coupled to a hydrogen supply system, the hydrogen supply system comprising a hydrogen storage unit,
  at least one hydrogen generating unit coupled to the AC electrical grid or to the at least one fluctuating source of AC electric power,
  a controller configured to:
  keep the selectively driven alternator coupled to the AC electrical grid and online regardless of the alternator being coupled to the internal combustion engine,
  power the at least one hydrogen generating unit with AC electric power from the at least one fluctuating source of AC electric power when, actual AC electric power generated by the at least one fluctuating source of electric power exceeds actual consumer AC electric power demand and simultaneously hydrogen storage capacity is available in the hydrogen storage unit, for generating hydrogen with the at least one hydrogen generating unit, store hydrogen generated by the at least one hydrogen generation unit in the hydrogen storage unit, and generate AC electric power with the at least one selectively driven alternator by combusting hydrogen from the hydrogen storage unit or a mixture of hydrogen from the hydrogen storage unit and another fuel in the internal combustion engine by operably coupling the internal combustion engine to the alternator and driving the alternator with the internal combustion engine, when actual electric power generated by the at least one fluctuating source of AC electric power is less than the consumer AC electric power demand and simultaneously the amount of hydrogen in the hydrogen storage unit is above a hydrogen amount threshold.

According to a possible implementation of the second aspect the system comprises an electric battery coupled to said grid by an inverter, wherein the controller is configured to power the at least one hydrogen generating unit with power from the at least one fluctuating source of electric power when, and preferably only when, actual electric power generated by the at least one fluctuating source of electric power exceeds actual consumer AC power demand and battery charge level is above an upper charge level set point and simultaneously hydrogen storage capacity is available in the hydrogen storage unit and battery charge level of the electric battery is above a battery charge threshold and battery charge level is above a lower charge level set point.

According to a third aspect, there is provided a method for operating an electrical grid, the grid having coupled thereto:

at least one fluctuating source of AC power generated from renewable energy, consumers creating a fluctuating AC power demand, a grid forming controllable inverter coupled to an electric battery, the method comprising:

operating the at least one fluctuating source of AC power as a slave to the grid, measuring grid frequency, controlling grid frequency with the controllable inverter as master controller to obtain a desired grid frequency, supplying power from the electric battery through the controllable inverter to the grid when the measured grid frequency is below the desired grid frequency by more than a first lower margin, and withdrawing power through the controllable inverter from the grid to the electric battery when the measured grid frequency is above the desired grid frequency by more than a second first upper margin.

The control method, system infrastructure, and system configuration allow for a hybrid energy generating system in an isolated grid situation that adjusts with fast and robust response using each component within their most optimal operation area supported by their own dynamic in combination with total system dynamic.

The system allows for operating with maximum continuous renewable energy penetration.

In a possible implementation form of the first or third aspect, the controllable inverter allows grid frequency to vary within the first lower margin and the first upper margin.

In a possible implementation form of the first or third aspect, the method comprises increasing the amount of power supplied to the grid by the battery according to a defined slope, preferably substantially proportionally, with increasing deviation of the measured grid frequency below the first lower threshold and vice versa, and increasing the amount of power withdrawn from the grid by the battery according to a defined slope, preferably proportionally with increasing deviation of the measured grid frequency above the first upper threshold and vice versa.

In a possible implementation form of the first or third aspect, the method comprises a controllable energy bank coupled to the grid, the energy bank having a capacity to withdraw a variable amount of power from the grid, and the energy bank preferably having a capacity to change the amount of energy withdrawn from the grid faster than the battery can change the amount of power withdrawn from the grid, and reducing power withdrawn from the grid by the energy bank when the measured grid frequency is below the desired grid frequency by more than a second lower margin, the second lower margin being smaller than the first lower margin, and increasing power withdrawn from the grid by the energy bank when the measured grid frequency is above the desired grid frequency by more than a second upper margin, the second upper margin being smaller than the first upper margin, preferably comprising the energy bank allowing grid frequency to vary within the second lower and the second upper margin.

In a possible implementation form of the first or third aspect, the method comprises increasing the amount of power withdrawn from the grid by the energy bank according to a defined slope, preferably proportionally, with increasing deviation of the grid frequency above the second upper threshold and vice versa, and decreasing the amount of power withdrawn from the grid by the energy bank according to a defined slope, preferably proportionally, with increasing deviation of the grid frequency below the second lower threshold and vice versa.

In a possible implementation form of the first or third aspect, the grid has selectively coupled thereto, in parallel with the controllable inverter, at least one driven or nondriven alternator for stabilizing grid frequency fluctuations, for adding inertia, and for improving grid voltage stability, comprising controlling reactive power, inertia and/or short-circuit effect in the grid by selectively coupling and decoupling the at least one or more selectively driven or nondriven alternators to the grid in parallel with the controllable inverter, the driven alternators preferably being driven by an internal combustion engine, the alternator preferably being operably coupled to a flywheel to increase inertia.

In a possible implementation form of the first or third aspect, the method comprises measuring reactive power drawn from the controllable inverter, and coupling at least driven or nondriven alternator to the grid in parallel with the controllable inverter when reactive power drawn from the controllable inverter exceeds a first reactive power threshold, preferably coupling one or more additional driven or nondriven alternator to the grid in parallel with the controllable inverter when reactive power drawn from the controllable inverter remains above the first reactive power threshold.

In a possible implementation form of the first or third aspect, the method comprises keeping alternators online connected to the busbar for stabilizing the grid even though the internal combustion engines are disengaged from the alternators by a clutch system and stopped.

In a possible implementation form of the first or third aspect, the method comprises coupling one or more additional driven or nondriven alternators to the grid in parallel with the controllable inverter when wind turbines or other electric drives coupled to the grid are started up, preferably upon detection or notification of the turbines or other electric drives starting up.

In a possible implementation form of the first or third aspect, the method comprises measuring active power and reactive power, minimizing active power drawn from the controllable inverter, and covering reactive power with the at least one driven or nondriven alternator when reactive power is above a reactive power threshold, and preferably covering reactive power with the at least one fluctuating source of AC power when reactive power is below a predetermined threshold.

In a possible implementation form of the first or third aspect, the grid has selectively coupled thereto, in parallel with the controllable inverter, at least one alternator driven by an internal combustion engine, the method comprising start increasing engine power production according to a defined slope when the measured grid frequency is below the desired grid frequency by more than a third lower margin, the third lower margin being smaller than the second lower margin, and decreasing engine power according to a defined slope when the measured grid frequency exceeds the desired grid frequency by more than a third upper margin, the third upper margin being smaller than the second upper margin, preferably comprising the driven alternator allowing grid frequency to vary within the third lower and the third upper margin.

In a possible implementation form of the first or third aspect, the method comprises controlling a battery charge level within a nominated control band, comprising for a grid having the energy bank coupled thereto, increasing power withdrawn from the grid by the energy bank when the battery charge level is above the upper limit of the control band and/or for a grid having the generator driven by an internal combustion engine coupled thereto, starting and/or increasing engine power when the battery charge level is below a lower limit of the control band.

In a possible implementation form of the first or third aspect, the method comprises charging the battery by withdrawing energy from the grid when surplus power is available from the fluctuating source of AC power.

In a possible implementation form of the first or third aspect, the method comprises controlling grid voltage with the controllable inverter as master controller to obtain a desired grid voltage.

In a possible implementation form of the first or third aspect, the grid is an isolated grid.

In a possible implementation form of the first or third aspect, the renewable energy generation systems are slave to the controllable inverter and follow control signals from a charge level band in the battery coupled to the controllable inverter.

In a possible implementation form of the first or third aspect, the grid-forming inverter battery is able to take total load on the consumer side with the battery having sufficient fast capability for the energy balancing functionality of the battery inverter system.

In a possible implementation form of the first or third aspect, the energy bank is frequency controlled.

In a possible implementation form of the first or third aspect, a continuous load on the energy bank is used for heating purposes.

In a possible implementation form of the first or third aspect an additional storage solution will is provided, and the surplus energy is the capturing into the additional storage solution instead of reducing power output of the one or more fluctuating sources of AC power from renewable energy.

In a possible implementation form of the first or third aspect, the additional storage feeds storage energy back into the system via the control grid-forming battery inverter system or by its own electrical energy generation system.

In a possible implementation form of the first or third aspect, the battery system is charged by surplus renewable energy.

In a possible implementation form of the first or third aspect, the grid frequency is measured with a high number of impulses per second, for example, more than 2250 impulses per second, preferably more than 4500 impulses per second, allowing a fast reading of the frequency trend variations, hence allowing for fast adjustments of the frequency by the controllable inverter.

In a possible implementation form of the first or third aspect, the voltage at the busbar is sensed and compared with the desired reference value, and the voltage difference between them is sent to the proportional plus integral controller.

In a possible implementation form of the first or third aspect, a sine wave having amplitude 1 and reference frequency is multiplied to generate a reference signal, and this reference signal produces pulse width modulated pulses to switch on/off a voltage source inverter.

According to a fourth aspect, there is provided a controller for operating an electrical grid, the grid having coupled thereto:
at least one fluctuating source of AC power generated from renewable energy,
consumers creating a fluctuating AC power demand,
a controllable inverter coupled to an electric battery, the controller being configured to:
operate the at least one fluctuating source of AC power as a slave to the grid,
the controller being configured to:
measure grid frequency,
control grid frequency with the controllable inverter as master controller to obtain a desired grid frequency,
supply power from the electric battery through the controllable inverter to the grid when the measured grid frequency is below the desired grid frequency by more than a first lower margin, and
withdraw power through the controllable inverter from the grid to the electric battery when the measured grid frequency is above the desired grid frequency by more than a second upper margin.

According to a third aspect, there is provided an energy supply system for operating a grid coupled to at least one fluctuating source of AC power generated from renewable energy and to consumers creating a fluctuating AC power demand, the system comprising a controllable inverter coupled to an electric battery configured to be coupled to the grid and a controller configured to:
operate the at least one fluctuating source of AC power as a slave to the grid,
a controller configured to:
measure grid frequency,
control grid frequency with the controllable inverter as master controller to obtain a desired grid frequency,
supply power from the electric battery through the controllable inverter to the grid when the measured grid frequency is below the desired grid frequency by more than a first lower margin, and
withdraw power through the controllable inverter from the grid to the electric battery when the measured grid frequency is above the desired grid frequency by more than a second upper margin.

According to a fifth aspect, there is provided a method for operating an electrical grid, the grid having coupled thereto:
- at least one fluctuating source of AC power generated from renewable energy,
- consumers creating a fluctuating AC power demand,
- a grid forming controllable inverter coupled to an electric battery, the method comprising:
- operating the at least one fluctuating source of AC power as a slave to the grid up to a controlled maximum power level, measuring grid frequency,
- controlling grid frequency with the controllable inverter as master controller to obtain a desired grid frequency, monitoring charge level of the battery, and
- reducing the controlled maximum power level when the charge level of the battery exceeds an upper battery charge level threshold.

According to a possible implementation form of the fifth aspect, the at least one fluctuating source of AC power comprises a photovoltaic based source of AC power and a wind turbine based source of AC power, comprising reducing power from the photovoltaic source of AC power before reducing power from the wind turbine based source of AC power when reducing the maximum power level and vice versa.

According to a possible implementation form of the fifth aspect, an energy bank is connected to the grid, comprising increasing power absorbed by the energy bank when the battery charge level exceeds the battery charge level threshold.

According to a possible implementation form of the fifth aspect, the method comprises activating a motor and or engine driven alternator coupled to the grid by starting a motor or engine coupled to an alternator or by coupling a running motor or engine to an alternator coupled to the grid when the battery charge level is below a lower battery charge level threshold.

According to a sixth aspect, there is provided energy supply system for operating a grid coupled having coupled thereto:
- at least one fluctuating source of AC power generated from renewable energy,
- consumers creating a fluctuating AC power demand, a grid forming controllable inverter coupled to an electric battery, the energy supply system comprising a controller configured to:
- operate the at least one fluctuating source of AC power as a slave to the grid up to a controlled maximum power level,
- measure grid frequency,
- control grid frequency with the controllable inverter as master controller to obtain a desired grid frequency,
- monitor charge level of the battery, and
- reduce the controlled maximum power level when the charge level of the battery exceeds an upper battery charge level threshold.

According to a seventh aspect, there is provided a method for operating an electrical grid, the grid having coupled thereto:
- at least one fluctuating source of AC power generated from renewable energy,
- consumers creating a fluctuating AC power demand,
- a grid forming controllable inverter coupled to an electric battery,
- a power bank capable of absorbing power from the grid at a variable and controllable level rate the method comprising:
- operating the at least one fluctuating source of AC power as a slave to the grid up to a controlled maximum power level, measuring grid frequency,
- controlling grid frequency with the controllable inverter as master controller to obtain a desired grid frequency, monitoring temperature of the battery, and
- absorbing surplus power with the battery when the battery temperature is below a first battery temperature threshold, absorbing surplus power with the energy bank when the battery temperature is above a first battery temperature threshold and/or
- absorbing surplus power with the energy bank when an increase in surplus power accelerates above a level defined by a first surplus power acceleration threshold.

According to a possible implementation form of the seventh aspect, the method comprises reducing power from the at least one fluctuating of AC power when the battery temperature is above the first threshold and/or when the energy bank is absorbing energy at a level above a first energy bank absorption capacity level.

According to an eighth aspect, there is provided an energy supply system for operating a grid coupled having coupled thereto:
- at least one fluctuating source of AC power generated from renewable energy,
- consumers creating a fluctuating AC power demand,
- a grid forming controllable inverter coupled to an electric battery,
- a power bank capable of absorbing power from the grid at a variable and controllable level rate the energy supply system comprising a controller configured to:
- operate the at least one fluctuating source of AC power as a slave to the grid up to a controlled maximum power level,
- measure grid frequency,
- control grid frequency with the controllable inverter as master controller to obtain a desired grid frequency,
- monitor temperature of the battery, and absorbing surplus power with the battery when the battery temperature is below a first battery temperature threshold,
- absorb surplus power with the energy bank when the battery temperature is above a first battery temperature threshold and/or
- absorb surplus power with the energy bank when an increase in surplus power accelerates above a level defined by a first surplus power acceleration threshold.

According to an eighth aspect, there is provided method for operating an isolated AC electrical grid, the grid having coupled thereto:
- at least one fluctuating source of AC electric power generated from renewable energy for supplying AC electric power to the AC electrical grid,
- consumers creating a fluctuating consumer AC electric power demand on the AC electrical grid,
- at least one selectively driven alternator, the selectively driven alternator being selectively operably couplable to an internal combustion engine operated on fuel, the internal combustion engine being coupled to a fuel supply system, the fuel supply system comprising a fuel storage unit,
- at least one fuel generating unit coupled to the AC electrical grid and/or to the at least one fluctuating source of AC electric power, the method comprising:
keeping the selectively driven alternator to the AC electrical grid and online regardless of the alternator being coupled to the internal combustion engine,
powering the at least one fuel generating unit with AC electric power from the at least one fluctuating source of AC electric power when, and preferably only when actual AC electric power generated by the at least one fluctuating source of AC electric power exceeds actual consumer AC electric power demand and simultaneously fuel storage capacity is available in the hydrogen storage unit, for generating hydrogen with the at least one fuel generating unit,
storing fuel generated by the at least one fuel generating unit in the fuel storage unit,
generating AC electric power with the at least one selectively driven alternator by combusting fuel from the fuel storage unit in the internal combustion engine by operably coupling the internal combustion engine to the alternator 34 and driving the alternator with the internal combustion engine, when, and preferably only when actual AC electric power generated by the at least one fluctuating source of AC electric power is less than the actual consumer AC electric power demand and simultaneously the amount of hydrogen in the fuel storage unit is above a fuel amount threshold.

These and other aspects will be apparent from the embodiments described below.

BRIEF DESCRIPTION OF THE DRAWINGS

In the following detailed portion of the present disclosure, the aspects, embodiments, and implementations will be explained in more detail with reference to the example embodiments shown in the drawings, in which.

DETAILED DESCRIPTION

Figure 1:
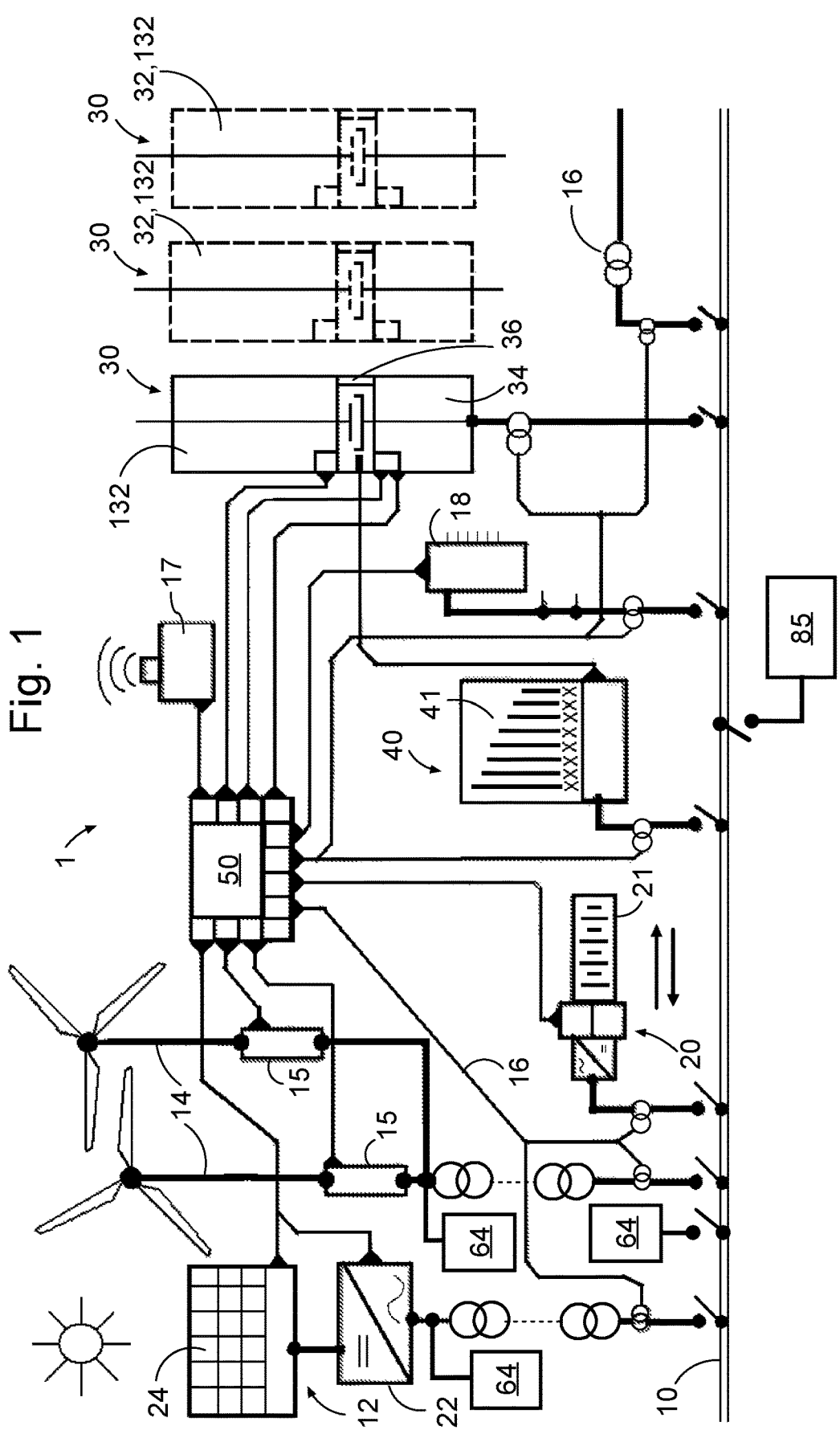
FIG. 1 is a diagrammatic overview of a system comprising an embodiment of an energy supply system.

FIG. 1 illustrates system 1 for supplying power to an isolated grid, comprising both required and optional elements. The power grid, preferably an isolated grid that preferably only is provided with electric power from the power supply system 1, is connected to the power supply system 1 by a busbar 10. The grid connects to consumers that create a fluctuating AC power demand on the grid.

A master controller 50 (an electronic control unit), controls the operation of the power supply system 1. The power supply system 1 comprises one or more fluctuating sources of AC power generated from renewable energy. These fluctuating sources of AC power are in the shown embodiment in the form of a wind turbine 14 and a solar energy collector 12. However, it is understood that the fluctuating sources of AC power 12, 14 generated from renewable energy may include other forms of renewable energy e.g. wave energy, tidal energy, or hydro energy. The wind turbines 14 comprise a terminal box 15 each and are coupled to the busbar 10. The wind turbines 14 receives a control signal, e.g. via a signal line, from the master controller 50, and the master controller 50 receives information about the operation of the wind turbine 14. The controller 50 is powered by an auxiliary power supply unit 18.

The solar energy collector 12 comprises one or more solar panels 24 and is coupled to an inverter 22 which is in turn coupled to the busbar 10. The inverter 22 receives a control signal from the master controller 50 and the master controller receives information about the operation of the solar energy collector 12 from the inverter 22, e.g. via a signal line.

At least one grid forming controllable inverter 20 is coupled to a rechargeable electric battery 21, so that the controllable inverter 20 can, depending on need, receive electric power from the battery 21 and store electric power in the battery 21. Several grid forming controllable inverters 20 can be arranged in parallel to obtain the required capacity and/or redundancy. The battery 21 can be of any suitable type comprising secondary cells, with a suitable capacity to store electrical charge and a sufficiently high C-rate. In an embodiment, the battery 21 is assisted by power from the fuel cell for the supply of electric power to the controllable inverter 20. Several batteries 21 can be arranged in parallel to obtain the required capacity and/or redundancy.

The grid forming controllable inverter 20 is coupled to the master controller 50, e.g. via a signal line, and the operation of the grid forming controllable inverter 20 is controlled by the master controller 50. In an embodiment, the master controller 50 is an integral part of the grid forming controllable inverter 20.

Figure 4:
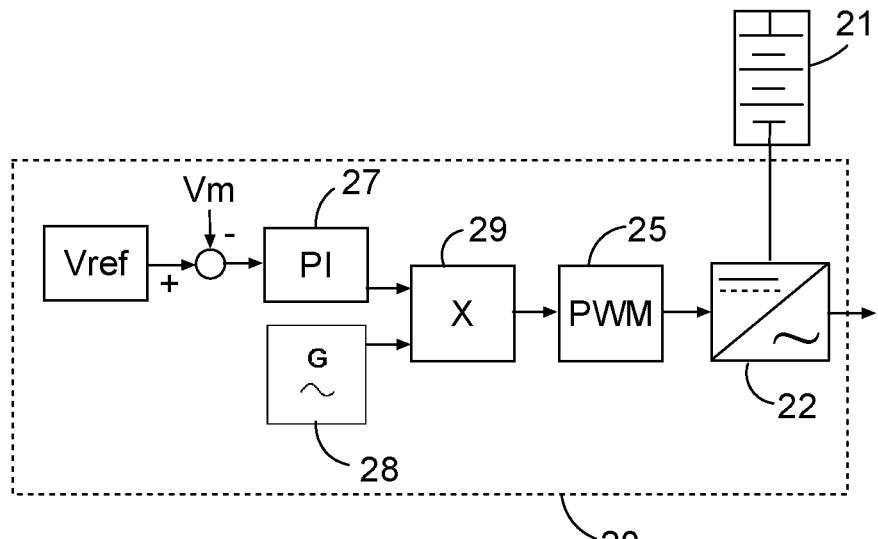
FIG. 4 is a diagrammatic illustration of a controllable inverter that is used in the system of FIG. 1.

The grid forming inverter control structure incorporates a voltage regulator and its frequency is auto-generated. The controllable inverter 20 is grid forming, i.e. it is responsible for producing and maintaining voltage and frequency at the busbar 10. Thus, the controllable inverter 20 ensures that the grid operates with a required voltage (Vref) and frequency (e.g. 230 V and 50 Hz or 110 V and 60 Hz) and this is in part achieved by the inverter control. The diagram of the inverter control scheme is shown in FIG. 4. The voltage at the busbar 10 is sensed (Vm) and compared with the desired reference value (Vref) and the difference between them is sent to proportional plus integral (PI) controller 27. A sine wave having amplitude 1 and frequency 50 Hz (or other desired value) wave generator 28 is multiplied in a multiplier 29 to generate the reference signal. This reference signal is sent to a pulse width modulator 25 to produce pulse width modulated (PWM) pulses to switch on/off a voltage source inverter 20. An LC filter (not shown) is arranged in the controllable inverter 20 in order to eliminate the high frequency harmonics from output AC voltage.

A controllable energy bank 40 is coupled to the grid. The energy bank 40 is controlled by the master controller 50, e.g. via a signal line. The energy bank 40 has a capacity to withdraw a variable amount of power from the grid, and the energy bank 40 preferably has a capacity to change the amount of energy withdrawn from the grid faster than the battery 21 can change the amount of power withdrawn from the grid. The energy bank 40 is a system that is coupled to the grid via the busbar 10 to provide rapid changes of resistive load on the grid. The energy bank 40 provides fast regulation with load steps in a binary range. In an embodiment, the energy bank 40 is a resistive load bank or a group of resistive load banks that are individually or groupwise selectively coupled to and decoupled from the grid.

The energy bank 40 provides a very fast absorbing capacity of excess electric power, in an embodiment the energy bank 40 comprising a number of resistors 41, preferably air cooled or water cooled or a combination thereof. The resistors 41 are arranged to directly absorb electrical energy from the grid and convert it into heat. In an embodiment, the energy bank 40 comprises electrolysis units (not shown) instead of or in addition to resistors 41 for energy bank 40.

The grid has selectively coupled thereto, in parallel with the controllable inverter 20, at least one driven or nondriven alternators 34 for stabilizing grid frequency fluctuations by adding inertia and for improving grid voltage stability. Nondriven alternators are alternators that are rotating synchronously with the grid and are kept spinning by the grid and form a condenser. Nondriven alternators are not coupled to an engine, or can at least be disengaged from such engine. e.g. by a clutch, e.g. when the nondriven alternator is part of a hybrid generator set. In case the nondriven alternator is not part of a hybrid generator set, the nondriven alternators are typically connected to a motor, e.g. an electric drive motor, only for "soft" starting up of the nondriven alternator.

These alternators are controlled by the master controller 50 e.g. via signal lines. The alternator 34 is in an embodiment driven by an internal combustion engine 32. This so-called hybrid genset solution 30 with a genset of the standard type equipped with clutch system 36 of standard type. Additional inertia mass may be added to the alternators, for example in the form of the flywheel (not shown), to increase the kinetic energy effect. The alternator 34 is connected to an internal combustion engine 32 on a common bedframe for engine power backup function. When alternator 34 is online (rotating in sync with the grid), engine start-up is fast as the internal combustion engine 32 only starts up itself and does not have to accelerate the alternator rotor from 0 rpm to synchronous rpm as alternator 34 is already connected and online. Engine clutch-in is performed at synchronous rpm between alternator 34 and internal combustion engine 32. The alternator 34 may be equipped with an air duct system for ventilation air for connecting to nominated engine filter housing as described in EP0745186. The internal combustion engines 32 may be hybrid equipped for optimal operation in lower loads and for having fast response which may include the engine cooler system separated from the internal combustion engine as described in EP0745186.

A supervisory control and data acquisition system (SCADA) is 17 is coupled to the master controller 50, e.g. via a signal line, for supervisory management and is connected to a large area network, e.g. the Internet via a wireless or wired connection.

An AUX supply 14 provides power for the master controller 50 and others auxiliary equipment including measurement equipment.

Grid supply 16 connects the busbar 10 to the grid.

Figure 2:
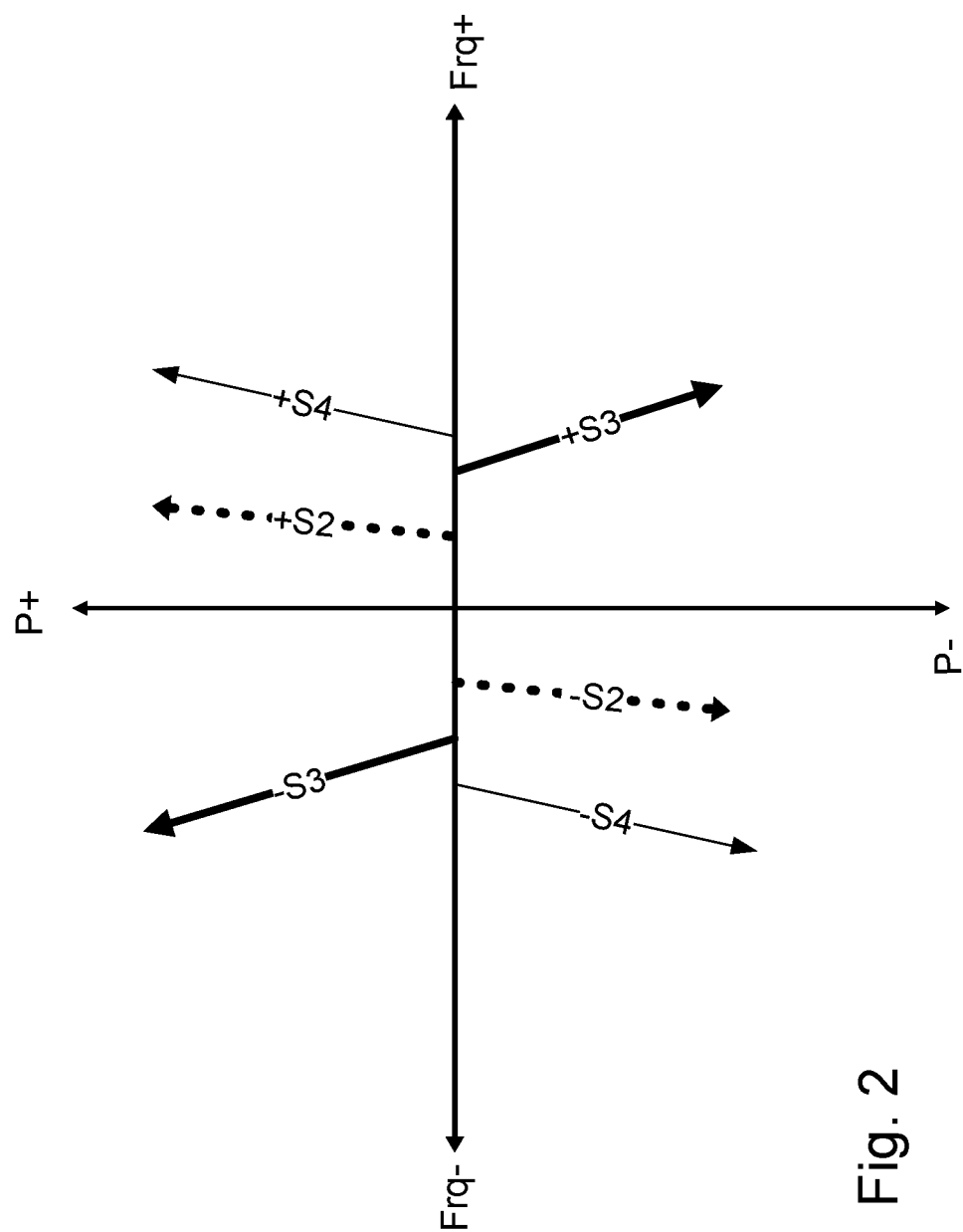
FIG. 2 is a graph illustrating a first control principle.

FIG. 2 illustrates a first control principle that is implemented by the master controller 50. The master controller 50 is configured to operate the at least one fluctuating source of AC power 12,14 as a slave to the grid, to measure grid frequency, to control grid frequency with the controllable inverter 20 as master controller to obtain a desired grid frequency, to supply power "+S3" from the electric battery 21 through the controllable inverter 20 to the grid when the measured grid frequency is below the desired grid frequency by more than a first lower margin, and to withdraw power "−S3" through the controllable inverter 20 from the grid to the electric battery 21 when the measured grid frequency is above the desired grid frequency by more than a second upper margin. The lower margin is at the root of the arrow+S3 and the upper margin is at the root of the arrow −S3. The controllable inverter 20 allows the grid frequency to vary within the first lower margin and the first upper margin.

The main control principle is controlling via frequency. This results in a high-power quality typically within approximately +/−0.4-0.8 Hz.

The grid frequency is measured with a high number of impulses per secs giving a fast reading of the frequency trend variations, hence allowing for fast adjustments.

The amount of power supplied to the grid by the battery is increased according to a defined slope in kW/see illustrated by the orientation of arrow "+S3", substantially proportionally, with increasing deviation of the measured grid frequency below the first lower margin and vice versa.

The amount of power withdrawn from the grid by the battery 21 is increased according to a defined slope in kW/see illustrated by the orientation of the arrow "−S3", proportionally with increasing deviation of the measured grid frequency above the first upper margin and vice versa.

Power is in an embodiment withdrawn under control from the master controller 50 from the grid by the energy bank 40 when the measured grid frequency is below the desired grid frequency by more than a second lower margin, the second lower margin being smaller than the first lower margin, and power withdrawn from the grid under control of the master controller 50 by the energy bank 40 is increased when the measured grid frequency is above the desired grid frequency by more than a second upper margin, the second upper margin being smaller than the first upper margin, Thus, the energy bank allows grid frequency to vary within the second lower and the second upper margin.

The amount of power withdrawn from the grid by the energy bank 40 is in an embodiment increased according to a defined slope in kW/see illustrated by the orientation of the arrow "+S2, proportionally, with increasing deviation of the grid frequency above the second upper threshold and vice versa. The amount of power withdrawn by the grid from the energy bank 40 is decreased according to a defined slope in kW/see illustrated by the arrow "−S2", proportionally, with increasing deviation of the grid frequency below the second lower threshold and vice versa.

Reactive power, inertia, and/or short-circuit effect in the grid are in an embodiment controlled by the master controller 50 selectively coupling and decoupling the at least one or more selectively driven or nondriven alternators 34 to the grid in parallel with the controllable inverter 20. The alternators 34 act as condensers and the alternators 34 can be replaced or supplemented by other forms of condensers.

Reactive power drawn from the controllable inverter 20 is in an embodiment measured, and at least one driven or nondriven alternator 34 is coupled by the master controller 50 to the grid in parallel with the controllable inverter 21 when reactive power drawn from the controllable inverter 21 exceeds a first reactive power threshold, preferably coupling one or more additional driven or nondriven alternators 34 to the grid in parallel with the controllable inverter 20 when reactive power drawn from the controllable inverter 20 remains above the first reactive power threshold.

One or more additional driven or nondriven alternators 34 are in an embodiment coupled to the grid by the master controller 50 in parallel with the controllable inverter 20 when wind turbines 14 or other electric drives coupled to the grid are started up, preferably upon detection or notification of the wind turbines 14 or other electric drives starting up.

According to an embodiment the master controller 50 receives measurements of active power and reactive power, and the master controller 50 is configured to minimize active power drawn from the controllable inverter and covering reactive power with the at least one driven or nondriven alternator 34 when reactive power is above a reactive power threshold. Reactive power is covered with the at least one fluctuating source of AC power when reactive power is below a predetermined threshold.

Figure 3:
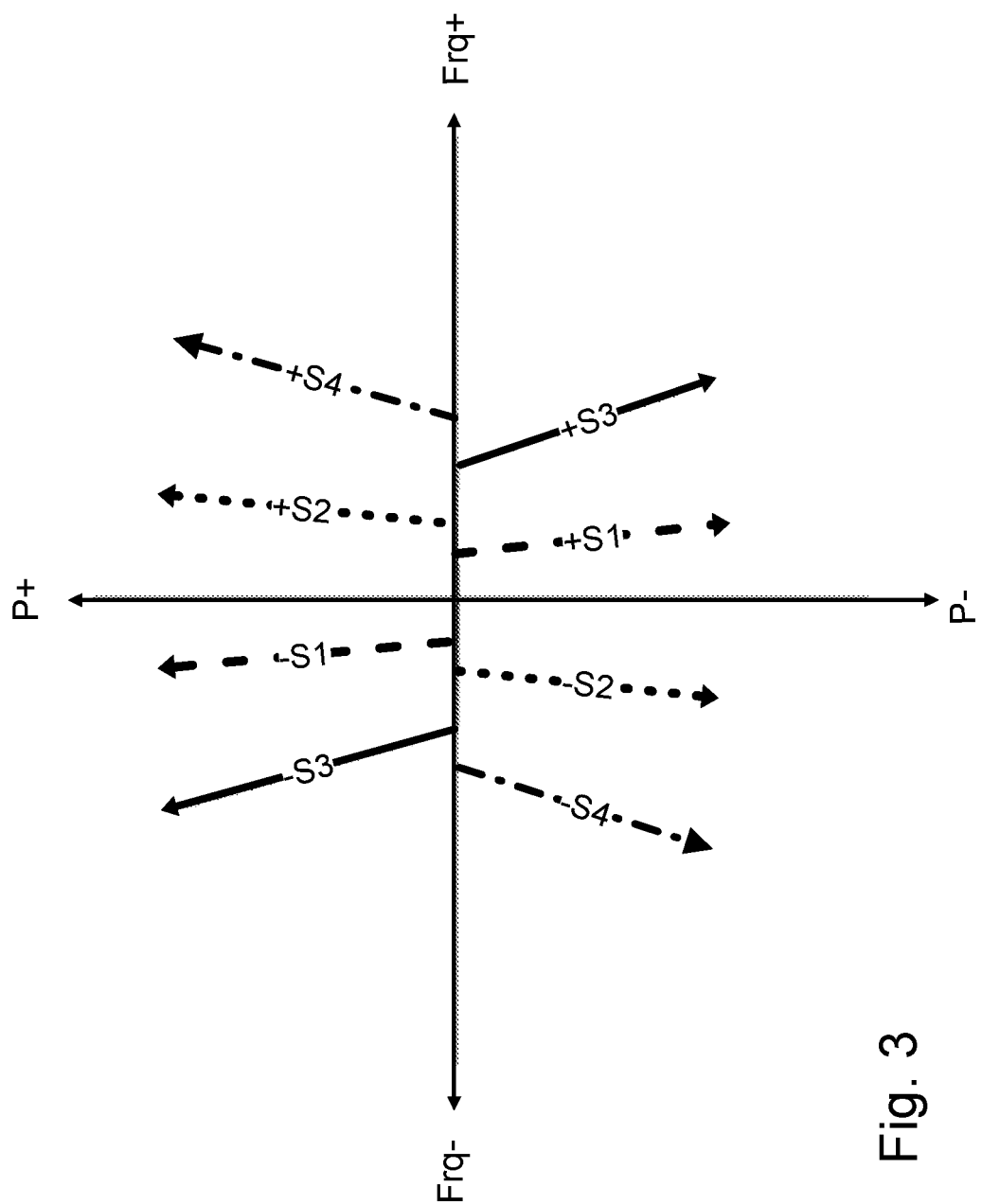
FIG. 3 is a graph illustrating a second control principle.

According to the second control principle illustrated in FIG. 3, which is combined with the first control principle, the master controller 50 is configured to start increasing power production through one or more internal combustion engine driven alternators 34 according to a defined slope in kW/see shown by the orientation of the arrow "−S1" when the measured grid frequency is below the desired grid frequency by more than a third lower margin, the third lower margin being smaller than the second lower margin. The root of the arrow "−S1" corresponds to the third lower margin. The master controller 50 is configured to start reducing power production through one or more internal combustion engine driven alternators 34 when the measured grid frequency exceeds the desired grid frequency by more than a third upper margin according to a defined slope in kW/see shown by the orientation of the arrow "+S1". The third upper margin is smaller than the second upper margin and corresponds to the root of the arrow "+S1". The master controller 50 allows the operation of the internal combustion engine driven alternators 34 and effected the grid frequency varies within the third lower and the third upper margin.

In an embodiment, the master controller 50 is configured to control the battery charge level of the battery 21 within a nominated control band, by increasing power withdrawn from the grid by the energy bank 40 when the battery charge level is above the upper limit of the control band and/or for a grid having the alternator 34 driven by an internal combustion engine coupled thereto, starting and/or increasing engine power when the battery charge level is below a lower limit of the control band.

In an embodiment, the master controller 50 is configured to charge the battery 21 by withdrawing energy from the grid when surplus power is available from the fluctuating source of AC power 12,14.

In an embodiment control principle 1, is active in parallel with control principle 2.

The energy balancing function is in an embodiment based on the grid-forming battery inverter 20 operating in frequency control mode in parallel with controlling the alternators 34. In an embodiment where the alternators are coupled to an internal combustion engine 32 via clutch 36, the internal combustion engine 32 is clutched out and stopped when 100% or more renewable energy is available for the grid. In this scenario, the alternator 34 continues online drawn by the renewable energy or the energy from the battery 21. In an embodiment, energy bank control is used to assist to dampen fast and/or large energy fluctuations. In an embodiment, the energy bank 40 is frequency controlled. The master controller 50 is configured to charge the battery 21 by surplus renewable energy and not from energy from an internal combustion engine 32.

When there is more than a hundred percent renewable energy available to the grid, the master controller 50 is configured to operate according to dynamic control principle 1. 100% and more renewable energy surplus is a situation where there is more renewable energy available than consumption on the consumer side. In this scenario, the master controller 50 is configured to clutch out and stop the internal combustion engines 32 while the alternators 34 continue online rotating in parallel with the controllable battery inverter 20. The master controller 50 is configured to increase and decrease the amount of power consumed by the energy bank 40 to assists dampen energy fluctuations caused e.g. by the fluctuating sources of renewable energy and/or fluctuations in consumer demand.

In this scenario, the controllable inverter 20 operates in frequency control mode and controls the frequency within a deadband between the +S3 Hz to −S3 Hz frequency setpoints. The renewable energy sources 12, 14 are controlled by the master controller 50 in response to battery charge level of the battery 21 within a nominated kW band in battery+S4 kWh to −S4 kWh. The master controller is in an embodiment configured to activate the energy bank 40 within deadband+S2 Hz to −S2 Hz frequency setpoints depending on the need for damping energy fluctuations. The deadband+S2 Hz to −S2 of the energy bank 40 can, as shown, be chosen to be within the deadband+S3 to −S3 of the controllable inverter 20, for reducing wear and tear on the battery 21 and also to dampen large power variations on the grid. However, the deadband+S2 Hz to −S2 of the energy bank 40 can be chosen or adjusted to be outside the deadband+S3 to −S3 of the controllable inverter 20, in particular to assist to dampen large power variations on the grid.

When less than 100% renewable energy is available the master controller 50 is configured to operate according to this second control principle. Less than 100% renewable energy is the situation where the grid demand is larger than the power available either directly from wind and or PV and/or from stored in the battery 21. Internal combustion engines 32 are in operation and coupled to the alternators 34 operating with controlling the voltage and frequency of the grid in parallel with the controllable inverter 21. The master controller 50 is configured to control the generator sets (genset) 30 within the deadband+S1 Hz to −S1 Hz frequency setpoints, to control the controllable inverter 20 within the deadband+S3 Hz to −S3 Hz setpoints, and to optionally control the activation of the energy bank 40 within the deadband+S2 Hz to −S2 Hz frequency setpoints, depending also on the need for damping energy fluctuations.

When the grid frequency increases, e.g. due to increasing renewable energy and/or decreasing consumption the master controller 50 is configured to:
  decrease energy production from the combustion engine driven alternators 34 (gensets 30) at +S1 Hz,
  increase our consumption by the energy bank 40 at +S2 Hz, and
  to increase battery charge at +S3 Hz.

If the last genset 30 cannot operate down to zero load, the master controller 50 will load energy bank 40 with a load similar to the least genset minimum load, where after the internal combustion engine 34 is clutched out and stopped (preferably after a period of time (delay) in which the grid has been stable for a nominated period). Alternatively, the master controller 50 may charge increased charging of the battery 21. Battery charging may be increased until this charging level is similar to minimum load on last genset 30 before internal combustion engine 32 is clutched out and stopped, preferably after a period of time (delay) in which the grid has been stable for a nominated period.

The active energy bank controlling 40 is optional. Activation of the energy bank 40 depends on fluctuations or risk of periods with large fluctuations or depending on the condition of the battery 21. In a scenario where the grid frequency decreases, e.g. due to decreasing renewable energy and or increasing consumption the master controller 50 is configured to:
increase production using the internal combustion engine 34 at −S1 Hz, and
to increase production from the battery 21 at −S3 Hz.

In an embodiment in which there is no energy bank 40 or the energy bank 40 is non-active, its functionality above is eliminated in the main control method and system function without energy bank 40.

If the energy bank 40 is loaded it can increase and decrease load. If non-loaded, the energy bank 41 can only increase load.

In an embodiment, a continuous load on energy bank 40 is used for heating purposes.

The additional storage solution is in an embodiment integrated into the above control logic and instead of reducing PV and wind, the surplus energy is the capturing into the storage solution. Additional storage may feed storage energy back into the system via the nominated grid-forming battery inverter system or by its own electrical energy generation system depending on the type of technology.

A battery 21 charge level band is nominated, where battery charge level is kept for having both capacity available for energy production to cover load 100% and energy charging to absorb surplus energy 100% to balance the load variations. The master controller 50 uses the charge level band in the battery 21 for control of the renewable energy production by continuously providing a maximum power reference. The charge level band is defined based on a kW-charge level band operation area in the battery 21 where there is the least wear and tear on the battery. The renewable energy sources 12, 14. e.g. wind, solar are slaves and operate within (and up to) a controlled maximum power output limit.

In an embodiment the master controller 50 is configured to: operate the at least one fluctuating source of AC power 12, 14 as a slave to the grid up to a controlled maximum power output limit, to measure grid frequency, to control grid frequency with the controllable inverter 20 as master controller to obtain a desired grid frequency, to monitor the charge level of the battery 21, and to reduce the controlled maximum power output limit when the charge level of the battery 21 exceeds an upper battery charge level threshold.

In an embodiment where the fluctuating source of AC power comprises a solar panel 12 and a wind turbine 14, the master controller 50 comprising reducing power from the solar panel 12 before reducing power from the wind turbine 14 when reducing the maximum power level and vice versa. In an embodiment, the master controller 50 is configured to increase power absorbed by the energy bank 40 when the battery charge level exceeds the battery charge level threshold.

In an embodiment, the master controller 50 is configured to activate a motor and/or engine driven alternator 34 coupled to the grid by starting the motor or engine by coupling a running motor or engine to the alternator 34 when the battery charge level is below a lower battery charge level threshold.

In an embodiment the master controller 50 is configured to operate the at least one fluctuating source of AC power 12, 14 as a slave to the grid up to a controlled maximum power output limit, to measure grid frequency, to control grid frequency with the controllable inverter 20 as master controller to obtain the desired grid frequency, to monitor the temperature of the battery 21, and to absorbing surplus power with the battery 21 when the battery temperature is below a first battery temperature threshold, to absorb surplus power with the energy bank 40 when the battery temperature is above a first battery temperature threshold and/or absorb surplus power with the energy bank 40 when an increase in surplus power accelerates above a level defined by a first surplus power acceleration threshold. The master controller 50 can in this embodiment further be configured to reduce power from the at least one fluctuating source of AC power 12, 14 when the battery temperature is above the first threshold and/or when the energy bank 40 is absorbing energy at a level above a first energy bank absorption capacity level.

The controllable inverter 20 is controlled to preferably only cover active power. The reactive power is covered by the online alternators 34. Voltage can be set to be covered by the controllable inverter 20 and/or the online alternators 34, depending on circumstances.

When power from the alternators 34 approaches 0 kVar, wind turbine 14 and or solar inverters 22 will be ordered to absorb a small amount of reactive power.

The number of alternators 34 of the total alternator fleet remaining online is determined by, but not limited to, below requirements that are constantly calculated:
1. Reactive power requirements
2. Short circuit effect requirements
3. System electrical stability requirements incl. stability in inverter systems For system electrical stability, the master controller 50 makes active use of the mechanical inertia (kinetic energy) and electrical cadence of the online alternator fleet. If no genset 30 with clutch 36 is available, then a separate condenser system (not shown) can take over the role of disengaged online alternator capacity with a similar operation strategy. Additional condenser capacity is be added if there is too little available alternator capacity in the system.

At a first nominated setpoint for reactive power in the total energy system, the master controller 50 commands the photovoltaic unit 12 and or wind turbines 14 to assist in reactive power production. Preferably, the wind turbines 14 are started before the photovoltaic unit 12.

At a second nominated setpoint for reactive power in the total energy system, the master controller commands the controllable inverter 20 to assists in reactive power production.

The master controller is configured to monitor temperatures and cell voltage of the battery 21

If battery 21 reaches temperature max setpoint power from the photovoltaic sources 12, 22 is reduced before reducing power from the wind turbines until a minimum charge level in the nominated control band of the battery 21 is reached.

When the battery reaches a high temperature threshold, the master controller 50 controls the energy bank 40 within deadband+S2 Hz to −S2 Hz. The master controller 50 also activates the energy bank 40 to dampen energy fluctuations in battery 21.

To protect the battery 21 master controller applies the following strategies:
1. The controllable inverter 20 is set to allow increase in frequency at large power increases. For this strategy, the energy bank 40 will have an activation set point after +S3 Hz and will here start to assist to dampen the large power increase.
2. The energy bank increases load based on charge level in battery 21 increasing above upper charge level setpoint in control band in battery+S4 kWh at the same time as power from the wind turbines 14 wind and/or solar panels 12 is reduced.

3. The energy bank 41 is commanded to put in load as per ramp based on increase in power into battery 21 when a fast increase in power to the battery 21 or an increase in frequency is identified.

Figure 5:
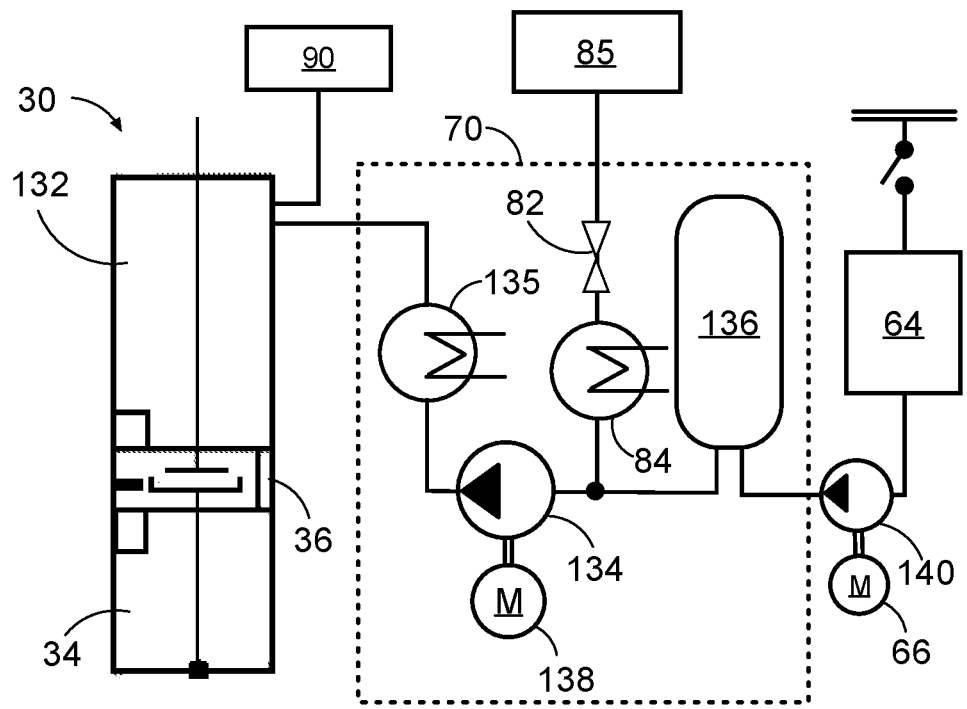
FIG. 5 is a diagrammatic illustration of a hydrogen generation, storage and supply system associated with the energy supply system of FIG. 1.

The system comprises one or more fuel generating units, configured for generating a fuel for use in the internal combustion engine (s) 132 from power from surplus energy from the fluctuating sources of renewable energy 12, 14, a fuel storage tank for storing the generated fuel, and a system for supplying the stored fuel to the internal combustion engine (s) 132 when operation of the internal combustion engines 132 is needed to drive the selectively driven alternators 32. In an embodiment, the system is provided with one or more hydrogen generating units (electrolysis units) 64. Preferably, the one or more electrolysis units 64 are powered exclusively from the sources of renewable energy, i.e. the fluctuating sources of renewable energy in the form of the photovoltaic source 12, 22 and/or the wind turbines 14. The electrolysis unit (s) 64 can be directly electrically coupled to one or more of the sources of renewable energy 12, 14 or can be coupled to the busbar 10 as shown in FIG. 5.

In FIG. 1 a hydrogen generating unit (electrolysis unit) 64 is powered by electric power from the photovoltaic sources 12,22, another electrolysis unit 64 is powered by electric power from the wind turbines 14, and yet another electrolysis unit 64 is powered by AC power from the busbar 10. However, it is understood that is not required that the system has more than one electrolysis unit 64. The electrolysis unit 64 has an inlet for water and hydrogen outlet and an oxygen outlet. As illustrated in FIG. 5, the hydrogen outlet of the electrolyzers unit 64 is connected to a hydrogen inlet of a hydrogen storage tank 136 by a feed conduit that includes a compressor unit 140 driven by an electric motor 66. The hydrogen is either stored at high pressure in the hydrogen storage tank 136, or the hydrogen is liquefied stored in liquid form in the hydrogen storage tank 136. The hydrogen storage tank 136 part of the hydrogen fuel system 70. The hydrogen fuel system 70 comprises a hydrogen supply line that connects a hydrogen outlet of the hydrogen storage tank 136 to the internal combustion engine 132, preferably to the hydrogen fuel valves of the internal combustion engine 132.

A high pressure hydrogen pump 134 driven by an electric motor 138 raises the pressure of the hydrogen in the hydrogen supply line to the required injection pressure. In an embodiment, the fuel valves of the engine may include a pressure booster for further increase of the pressure of the hydrogen fuel for injection into the engine. In an embodiment, the engine is a compression-ignition engine, in which the hydrogen is injected at or near the top dead center of the pistons. In another moment the engine is a spark-ignition engine, in which the fuel is mixed with the charging air the air-fuel mixture is compressed and ignited by a spark for other ignition means at or near top dead center (TDC) of the pistons. If the hydrogen is stored in liquid form in the storage tank 136, the hydrogen supply line will include a vaporizer 135 for vaporizing the hydrogen before supplied to the internal combustion engine/fuel valves of the internal combustion engine. In an embodiment the internal combustion engine is a dual fuel engine, that is configured in one mode to operate on hydrogen and in another mode to operate on a conventional fuel, e.g. fuel oil.

The cells of the electrolysis unit 64 comprise in the present embodiment polymer electrolyte membrane cells (PEM) or alkaline electrolysis cells (AECs). Alkaline electrolysers generally use nickel catalysts and are inexpensive but not very efficient. PEM electrolysers, generally use platinum group metal catalysts are more efficient and can operate at higher current densities. PEM electrolysis cells typically operate below 100° C. and are comparatively simple and accept widely varying voltage inputs which renders them suitable for use with renewable sources of energy such as solar PV or wind turbines. AECs operate optimally at high concentrations electrolyte (KOH or potassium carbonate) and at high temperatures, typically near 200° C.

The fuel cell 85 comprises an electrochemical cell that converts the chemical energy of the hydrogen with an oxidizing agent, preferably oxygen from air, into electricity through a pair of redox reactions. The fuel cell 85 is coupled to the hydrogen fuel system 70. A hydrogen supply line connects a hydrogen inlet of the fuel cell 85 to the outlet of the hydrogen storage tank 136. In an embodiment, the engine supply line includes a vaporizer 84 and a control valve 82 that controls the flow of hydrogen from the hydrogen storage tank 136 to the fuel cell 85. The control valve 82 is coupled to the master controller 50.

The one or more selectively driven alternators 34, are selectively operably couplable by a clutch 36 to the internal combustion engine 132 operated on hydrogen (or a mixture of hydrogen and another fuel). The clutch 36 is controlled by the master controller 50. When the role of the one or more selectively driven alternators 34 needs to be changed from a role of creating inertia to a role of also maintaining the network frequency, the master controller 50 will start up the internal combustion engine 132 and thereafter engage the clutch 36 so that the already rotating alternator 34 is coupled to and driven by the internal combustion engine 132. Thus, the master controller 50 is configured to clutch-in the internal combustion engine 132 when the internal combustion engine 132 is at synchronous rpm with the selectively driven alternator 34.

The internal combustion engine 132 is equipped for pre-pressuring and heating for optimal operation in lower loads and for having fast response and startup with one or more of below technical solutions—but not limited to—as follows:

For pre-pressuring the engine, the selectively driven alternator 34 is equipped with an air duct system for ventilation air for connecting to nominated engine filter housing as m described in EP0745186 or alternatively, the internal combustion engine 132 is equipped with a separate pre-pressuring system for similar pressure effect to nominated engine filter housing.

For control of heating of the internal combustion engine 132 the air cooler system is separated from the engine and controlled by temperature as per system described in EP0745186.

For control of heating of the internal combustion engine 132 the internal combustion engine 132 is equipped with a pre-heating system described in EP0745186.

The master controller 50 is configured to powering said at least one hydrogen generating unit 64 with power from said at least one fluctuating source of electric power 12,14 when, and preferably only when, actual electric power generated by said at least one fluctuating source of electric power 12,14 exceeds actual consumer AC power demand and battery charge level have reached an upper charge level set point and simultaneously hydrogen storage capacity is available in said hydrogen storage unit 136, so that hydrogen (and oxygen) is generated with said at least one hydrogen generating unit 64. The hydrogen generated by said at least one hydrogen generating unit 64 is stored in said hydrogen storage unit, e.g. hydrogen storage tank 136.

The master controller 50 is also configured to generate AC power with said at least one selectively driven alternator 34 by combusting hydrogen from said hydrogen storage unit 136 (or a mixture of hydrogen from said hydrogen storage unit 136 and another fuel) in said internal combustion engine 132, when actual electric power generated by said at least one fluctuating source of electric power 12, 14 is less than the actual consumer AC power demand and battery charge level has reached a lower charge level set point and simultaneously the amount of hydrogen in said hydrogen storage unit 136 is above a hydrogen amount threshold. The hydrogen amount threshold is greater than or equal to 0.

The master controller 50 is configured to generate AC power with said at least one selectively driven alternator 34 by combusting hydrogen from said hydrogen storage unit 136 (or a mixture of hydrogen from said hydrogen storage unit 136 and another fuel) in said internal combustion engine 132, when the charge level of said electric battery 21 is below a first battery charge level threshold.

The master controller 50 is configured to ramp up and down hydrogen production with said electrolysis system 64 as a function, preferably a proportional correlation, of the availability of actual surplus electric power generated by said at least one fluctuating source of electric power 12, 14. The actual surplus electric power is defined as the amount to which the actual power generated by said at least one fluctuating source of electric power 12, 14 exceeds the actual consumer AC power demand. The master controller 50 is in an embodiment configured to ramp up and down hydrogen production with the said hydrogen generating unit 64 as a function, preferably a proportional correlation, of the frequency of the grid. Both methods of ramping up and down the activity of the hydrogen production unit 64 can be combined.

In an embodiment, hydrogen generated by said hydrogen generating unit 64 is pressurized using a high-pressure pump 140 driven by an electric drive motor 66. In an embodiment, the hydrogen is also liquefied in the process. The master controller 50 is configured to powering said electric drive motor 138 with electric power generated by at least one fluctuating source of electric power 12,14.

In embodiment, the internal combustion engine 132 operates on a mixture hydrogen from the hydrogen storage unit 136 and another fuel such as fuel oil (pilot oil). The fuel oil can be supplied to the internal combustion engine separately from the hydrogen. The fuel oil can be supplied as a pilot oil, i.e. as an oil that ensures ignition. Preferably the fuel oil is injected at high pressure from fuel valves and the injection of the fuel oil can be timed for timed ignition.

In an embodiment, the internal combustion engine 132 is a compression ignited engine, i.e. an engine operating to the Diesel principle, and fuel is injected when the piston (s) is (are) at or near top dead center.

In an embodiment, the internal combustion engine 132 operates according to the Otto principle, and a mixture of fuel and charging air is compressed during the stroke of the piston (s) from bottom dead center to top dead center.

In an embodiment the mixture of hydrogen from the hydrogen storage unit and another fuel comprises a mixture of hydrogen from the hydrogen storage unit and one or more of petroleum gas, natural gas, syngas, biogas, ammonia. Biogas can be a mixture of gases, primarily consisting of methane, carbon dioxide and hydrogen sulphide, produced from raw materials such as agricultural waste, manure, municipal waste, plant material, sewage, green waste and food waste.

The controller is configured to determine said actual consumer AC power demand the actual electric power generated at least one fluctuating source of electric power 12, 14 and said actual consumer AC power demand with the actual electric power generated by at least one fluctuating source of electric power 12,14.

The master controller 50 is configured to generate AC power with said at least one selectively driven alternator 34 by combusting fuel other than hydrogen from the hydrogen storage unit 136, e.g. fuel from a fuel oil tank 90, in said internal combustion engine 132, when simultaneously the amount of hydrogen in said hydrogen storage unit 136 is below a hydrogen amount threshold and simultaneously battery charge level has reached a lower charge level set point, and preferably actual electric power generated by said at least one fluctuating source of electric power 12, 14 is less than the consumer AC power demand.

The master controller 50 is configured to generate AC power with said at fuel cell 85 by converting hydrogen from said hydrogen storage unit 136 into DC power and converting said DC power into AC power with said inverter when said when actual electric power generated by said at least one fluctuating source of electric power 12, 14 is less than the consumer AC power demand and simultaneously the amount of hydrogen in said hydrogen storage unit 136 is above a hydrogen amount threshold, said hydrogen amount threshold being greater than or equal to 0.

In an embodiment the master controller 50 is configured to control
grid frequency with the controllable inverter 20 as master controller to obtain a desired grid frequency, supply power from an electric battery 21 through the controllable inverter (20) to the grid when the measured grid frequency is below the desired grid frequency by more than a first lower margin, and withdraw power through the controllable inverter 20 from the grid to the electric battery 20 when the measured grid frequency is above the desired grid frequency by more than a second first upper margin.

In an embodiment the master controller 50 is configured to increase AC power production with said fuel cell 85 and said inverter 20 according to a defined slope when the measured grid frequency is below the desired grid frequency by more than a fourth lower margin, decreasing AC power production with said fuel cell 85 and said inverter 20 according to a defined slope when the measured grid frequency exceeds the desired grid frequency by more than a fourth upper margin.

Figure 6:
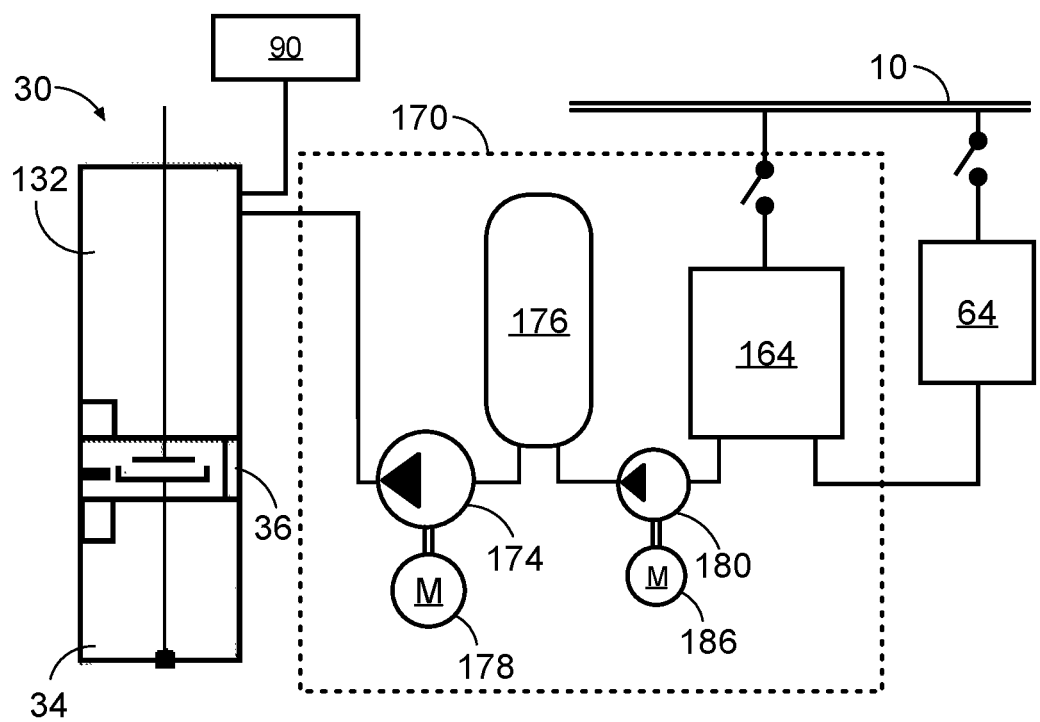
FIG. 6 is a diagrammatic illustration of the fuel generation, storage and supply system associated with the energy supply system of FIG. 1.

FIG. 6 shows another embodiment of the system. In this embodiment, structures and features that are the same or similar to corresponding structures and features previously described or shown herein are denoted by the same reference numeral as previously used for simplicity. In this embodiment, the system comprises a two-stage power to gas system 170, in which the hydrogen that is generated in the hydrolysis unit 64 is converted into fuel gas, e.g. syngas, methane, or liquid petroleum gas (LPG) by a hydrogen to fuel gas conversion unit 164. The hydrogen to fuel gas conversion unit 164 is powered e.g. by a connection with the busbar 10. The fuel gas that is generated by the fuel conversion unit 164 is stored in a fuel gas storage unit 176. In this embodiment, the master controller 50 is configured in a similar fashion to the embodiment above, to use only electrical power for generating fuel gas when there is a surplus of power from the fluctuating sources of renewable energy. The fuel gas stored in the fuel gas storage unit 176 is supplied to the internal combustion engine via a fuel pump 174 that is driven by an electric motor 178, and that is under control of the master controller 50. The operation and control of the two-stage power to gas system 170, is essentially identical to the operation of the hydrogen fuel system 70.

In an embodiment (not shown), the system comprises a two-stage power to liquid fuel system, in which hydrogen that is generated in the hydrolysis unit 64 is converted into a liquid fuel, e.g. methanol by a hydrogen to liquid fuel conversion unit. The operation and control of the two-stage power to gas system, is essentially identical to the operation of the hydrogen fuel system 70.

In an embodiment the system uses a single-stage power to gas system to produce methane using such as reversible solid oxide cell (ReSOC) technology. In this embodiment, methane produced using surplus energy from the fluctuating sources of renewable energy 12,22 is stored in a methane tank and supplied by the fuel supply system to the internal combustion engine (s) 132 when needed. The operation and control of the one-stage power to gas system, is essentially identical to the operation of the hydrogen fuel system 70.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single controller or other unit may fulfill the functions of several items recited in the claims. The mere fact that certain measures are recited in mutually different dependent claims does not indicate that a combination of these measured cannot be used to advantage.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure.

The invention claimed is:

1. A method for operating an isolated AC electrical grid, said AC electrical grid having coupled thereto:
    at least one fluctuating source of AC electric power generated from renewable energy for supplying AC electric power to said AC electrical grid,
    consumers creating a fluctuating consumer AC electric power demand on said AC electrical grid,
    at least one selectively driven alternator, said selectively driven alternator being selectively operably couplable to an internal combustion engine operated on hydrogen or a mixture of hydrogen and another fuel, said internal combustion engine being coupled to a hydrogen supply system, said hydrogen supply system comprising a hydrogen storage unit,
    at least one hydrogen generating unit coupled to said AC electrical grid and/or to said at least one fluctuating source of AC electric power,
    said method comprising:
    keeping said selectively driven alternator coupled to the AC electrical grid, rotating and online regardless of the alternator being coupled to the internal combustion engine,
    powering said at least one hydrogen generating unit with AC electric power from said at least one fluctuating source of AC electric power only when actual AC electric power generated by said at least one fluctuating source of AC electric power exceeds actual consumer AC electric power demand and simultaneously hydrogen storage capacity is available in said hydrogen storage unit, for generating hydrogen with said at least one hydrogen generating unit,
    storing hydrogen generated by said at least one hydrogen generating unit in said hydrogen storage unit,
    generating AC electric power with said at least one selectively driven alternator by combusting hydrogen from said hydrogen storage unit or a mixture of hydrogen from said hydrogen storage unit and another fuel in said internal combustion engine by operably coupling said internal combustion engine to said alternator and driving said alternator with said internal combustion engine, when actual AC electric power generated by said at least one fluctuating source of AC electric power is less than the actual consumer AC electric power demand and simultaneously the amount of hydrogen in said hydrogen storage unit is above a hydrogen amount threshold.

2. The method of claim 1, wherein an electric battery is connected to said AC electric grid by an inverter, comprising generating AC electric power with said at least one selectively driven alternator by combusting hydrogen from said hydrogen storage unit or a mixture of hydrogen from said hydrogen storage unit and another fuel in said internal combustion engine, when the charge level of said electric battery is below a first battery charge level threshold.

3. The method of claim 1, comprising a controller, wherein said controller is configured to ramp up and down hydrogen production with said hydrogen generating unit as a function, of the availability of actual surplus AC electric power generated by said at least one fluctuating source of AC electric power, wherein actual surplus AC electric power is defined as the amount to which the actual AC electric power generated by said at least one fluctuating source of AC electric power exceeds the actual consumer AC electric power demand, or said controller is configured to ramp up and down hydrogen production with said hydrogen generating unit as a function, of the frequency of the AC electrical grid.

4. The method according to claim 1, comprising pressuring hydrogen generated by said hydrogen generating unit using a high-pressure pump driven by an electric drive motor, and comprising powering said electric drive motor with AC electric power generated by said at least one fluctuating source of AC electric power.

5. The method according to claim 1, comprising determining said actual consumer AC electric power demand, determining the actual AC electric power generated by said at least one fluctuating source of AC electric power.

6. The method according to claim 1, wherein said at least one fluctuating source of AC electric power comprises a photovoltaic unit coupled to an inverter for inverting DC power generated by the photovoltaic unit to AC electric power.

7. The method according to claim 1, wherein said at least one fluctuating source of AC electric power comprises at least one wind turbine.

8. The method according to claim 1, wherein said hydrogen generating unit comprises an electrolysis unit, the electrolysis unit being supplied with AC electric power from one or more of: said photovoltaic unit, said inverter, said wind turbine, said AC busbar.

9. The method according to claim 1, wherein said at least one fluctuating source of AC electric power, said hydrogen generating unit and said selectively driven alternator, said selectively driven alternator and/or said inverter are connected to an AC busbar.

10. The method according to claim 1, comprising a clutch system between said internal combustion engine and said selectively driven alternator.

11. The method according to claim 1, wherein said controller is configured to clutch-in the internal combustion engine when the internal combustion engine is at synchronous rpm with the selectively driven alternator.

12. The method according to claim 1, comprising generating AC electric power with said at least one selectively driven alternator by combusting fuel other than hydrogen from said hydrogen storage unit in said internal combustion engine, when the amount of hydrogen in said hydrogen storage unit is below a hydrogen amount threshold and battery charge level is below lower charge level threshold.

13. The method according to claim 1, comprising at least one selectively driven alternator, said selectively driven alternator being selectively operably couplable to an internal combustion engine operated on a fuel other than hydrogen from said hydrogen storage unit, said method comprising generating AC electric power with said at least one selectively driven alternator by combusting fuel other than hydrogen from said hydrogen storage unit in said internal combustion engine, when the amount of hydrogen in said hydrogen storage unit is below a hydrogen amount threshold.

14. The method according to claim 1, wherein a fuel cell is coupled to said AC electrical grid via an inverter, said fuel cell being coupled to said hydrogen storage unit, comprising generating AC electric power with said fuel cell by converting hydrogen from said hydrogen storage unit into DC power and converting said DC power into AC power with said inverter.

15. The method according to claim 1, comprising:
operating the at least one fluctuating source of AC electric power as a slave to the AC electrical grid,
measuring grid frequency,
controlling grid frequency with a controllable inverter as master controller to obtain a desired grid frequency,
supplying AC electric power from an electric battery through the controllable inverter to the AC electrical grid when the measured grid frequency is below the desired grid frequency by more than a first lower margin, and
withdrawing AC electric power through the controllable inverter from the AC electrical grid to the electric battery when the measured grid frequency is above the desired grid frequency by more than a second first upper margin.

16. The method according to claim 14, comprising increasing AC electric power production with said fuel cell and said inverter according to a defined slope when the measured grid frequency is below the desired grid frequency by more than a fourth lower margin, decreasing AC electric power production with said fuel cell and said inverter according to a defined slope when the measured grid frequency exceeds the desired grid frequency by more than a fourth upper margin.

17. The method according to claim 1, wherein an electric battery is coupled to said AC electrical grid by an inverter, comprising powering said at least one hydrogen generating unit with AC electric power from said at least one fluctuating source of AC electric power when, and preferably only when, actual AC electric power generated by said at least one fluctuating source of AC electric power exceeds actual consumer AC electric power demand and battery charge level is above an upper charge level set point and simultaneously hydrogen storage capacity is available in said hydrogen storage unit and battery charge level of said electric battery is above a battery charge threshold.

18. An energy supply system for operating an isolated AC electrical grid, said AC electrical grid having coupled thereto:
at least one fluctuating source of AC electric power generated from renewable energy for supplying AC electric power to said AC electrical grid,
consumers creating a fluctuating consumer AC electric power demand on said AC electrical grid,
at least one selectively driven alternator, said selectively driven alternator being selectively operably couplable to an internal combustion engine operated on hydrogen or a mixture of hydrogen and another fuel, said internal combustion engine being coupled to a hydrogen supply system, said hydrogen supply system comprising a hydrogen storage unit,
at least one hydrogen generating unit coupled to said AC electrical grid or to said at least one fluctuating source of AC electric power,
a controller configured to:
keep said selectively driven alternator coupled to the AC electrical grid, rotating and online regardless of the alternator being coupled to the internal combustion engine,
power said at least one hydrogen generating unit with AC electric power from said at least one fluctuating source of AC electric power only when, actual AC electric power generated by said at least one fluctuating source of AC electric power exceeds actual consumer AC electric power demand and simultaneously hydrogen storage capacity is available in said hydrogen storage unit, for generating hydrogen with said at least one hydrogen generating unit,
store hydrogen generated by said at least one hydrogen generation unit in said hydrogen storage unit, and
generate AC electric power with said at least one selectively driven alternator by combusting hydrogen from said hydrogen storage unit or a mixture of hydrogen from said hydrogen storage unit and another fuel in said internal combustion engine by operably coupling said internal combustion engine to said alternator and driving said alternator with said internal combustion engine, when actual AC electric power generated by said at least one fluctuating source of AC electric power is less than the consumer AC electric power demand and simultaneously the amount of hydrogen in said hydrogen storage unit is above a hydrogen amount threshold.

19. The energy supply system according to claim 18, comprising an electric battery coupled to said AC electrical grid by an inverter, wherein said controller is configured to power said at least one hydrogen generating unit with AC electric power from said at least one fluctuating source of AC electric power when actual AC electric power generated by said at least one fluctuating source of AC electric power exceeds actual consumer AC electric power demand and battery charge level is above an upper charge level set point and simultaneously hydrogen storage capacity is available in said hydrogen storage unit.

* * * * *